Nov. 4, 1958 G. GRUNER 2,858,979
CIRCUITRY FOR VECTOR SOLUTION IN D.-C. ANALOG COMPUTERS
Filed Aug. 3, 1953 2 Sheets-Sheet 1
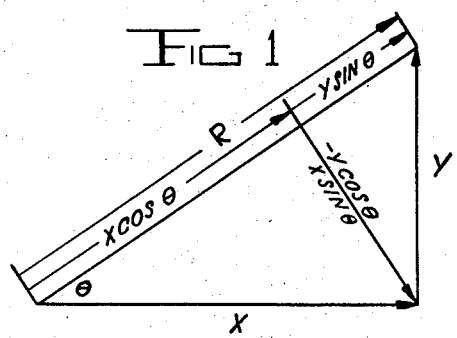
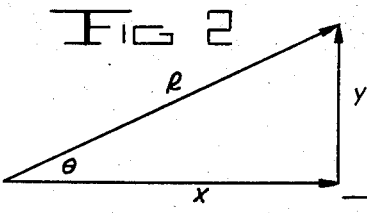
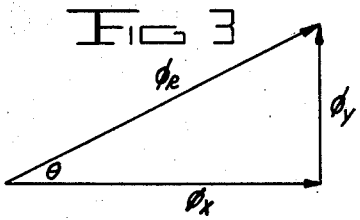
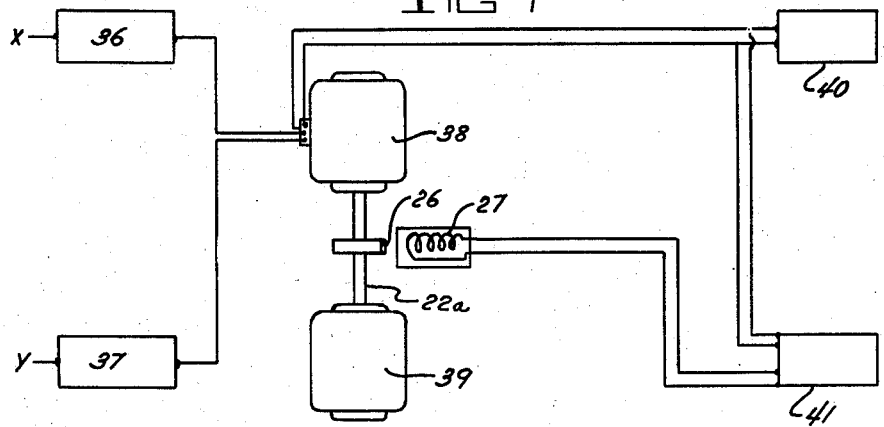
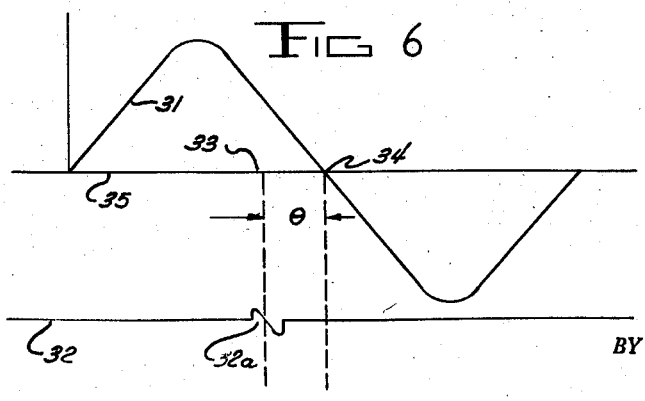
INVENTOR.
GARRETT GRUNER
BY SMITH & OLSEN
ATTORNEYS Nov. 4, 1958            G. GRUNER            2,858,979
CIRCUITRY FOR VECTOR SOLUTION IN D.-C. ANALOG COMPUTERS
Filed Aug. 3, 1953            2 Sheets-Sheet 2
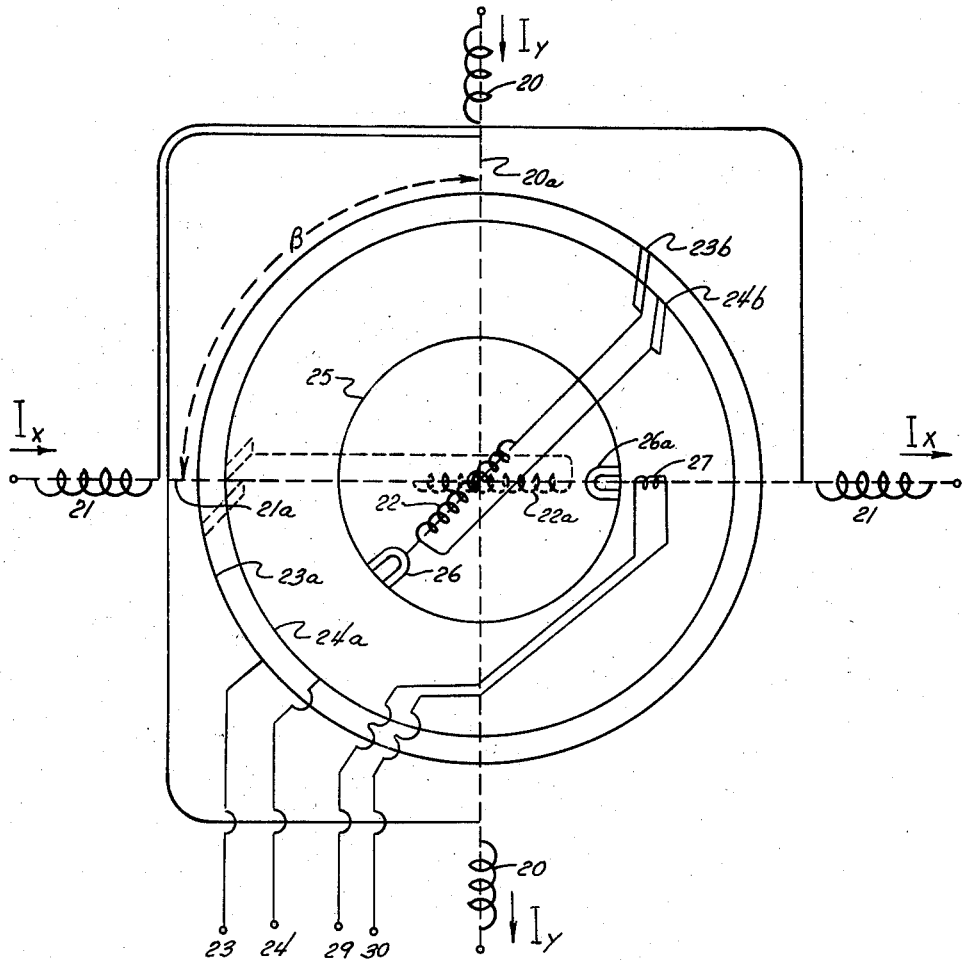
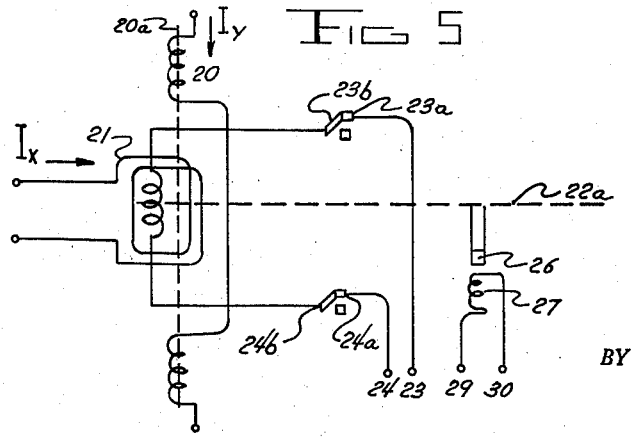
INVENTOR.
GARRETT GRUNER
BY SMITH & OLSEN
ATTORNEYS United States Patent Office 2,858,979
Patented Nov. 4, 1958

2,858,979

CIRCUITRY FOR VECTOR SOLUTION IN D. C. ANALOG COMPUTERS

Garrett Gruner, Ypsilanti, Mich., assignor to the Regents of the University of Michigan, Ann Arbor, Mich., a Michigan constitutional corporation Application August 3, 1953, Serial No. 371,812

7 Claims. (Cl. 235—61)

This invention relates to a mathematical computing device for combining two vector quantities having any angular relationship with one another and obtaining the magnitude of the resultant vector and its angular relationship with a reference vector.

An object of the invention is to provide a simple means for effecting the combination of vectors without the customary complexity of numerous vacuum tubes and other electric and mechanical devices necessary in the usual computing devices.

Another object of the invention is to provide a vector combining device whose accuracy is inherently a function of the mode of construction and where the accuracy is not dependent upon the proper co-functioning of numerous electronic circuits operating in conjunction with the computing device.

Still another object of the invention is to obtain the resultant vector of two component vectors and its phase relationship with one of the component vectors or any other angular reference in a device that does not require the use of servo-motors operating on the principle of error-determination and error correction.

It is still another object of the invention to provide a vector computing device whose method of operation is such that those not necessarily skilled in the art may effect repairs and proper operation of the unit without special training in the use of the device.

Another object of the invention is to provide a vector computing device not involving the use of servo-loop or feedback circuits thus decreasing the complexity of the device and increasing its inherent accuracy and reliability.

Another object of the invention is to devise and provide a means for vector combination in which the input information may be inserted in the form of a D. C. signal but whose output is an A. C. signal whose magnitude is proportional to the length of the resultant vector and whose phase relationship with an angular reference signal marker wave denotes easily and simply the phase relationship of the resultant vector with one of the input vector components.

It is another object of the present invention to provide a vector combining device that by reason of its construction effects a rapid computation of the desired quantities and their phase relationships in a shorter length of time than that required for prior devices.

Other objects of the invention will become apparent as the description progresses which, in company with the foregoing objects, make it clear that the present invention represents a new and novel means for effecting the desired vector combinations without need of the complex computing devices heretofore found necessary.

For purposes of clarity the description of the invention will pertain to the combination of two vectors, X and Y, having a quadrature relationship with one another. It is to be understood, however, that the limitation to this case is for purposes of clarity and does not effect a limitation on the scope of said invention since it will be apparent to those skilled in the art that two or more vectors having any angularity may be so combined by the use of additional co-operating units of the device to be described.

In the drawings:

Fig. 1 is a vector diagram of the mathematical operations of quadrature vector combining devices heretofore available to the art;

Fig. 2 is a vector diagram of the mathematical operations of the present invention;

Fig. 3 is a vector diagram of a magnetic field whose component fields are proportional in magnitude and parallel in direction to the vectors of Fig. 2;

Fig. 4 is a schematic diagram of the essential working parts of one embodiment of the present invention which is capable of effecting the desired vector combination;

Fig. 5 is a second schematic diagram similar to Fig. 4 but rotated in space 90 degrees to show the lateral displacement of certain elements of the illustrated embodiment;

Fig. 6 is a diagrammatic illustration of the two output voltages of the embodiment, one of which carries a marking pip which is used in determining the angularity of the resultant vector R and the other of which is a sine wave; and Fig. 7 is a schematic diagram of the incorporation of the unit described in Figs. 4 and 5 into a complete vector combining unit with its phase and amplitude indicating devices.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Prior to the present invention, the method of combining two quadrature vectors has been a complicated mathematical procedure. Referring to Fig. 1, a brief description of such procedure will be given. The prior devices, by means of vector resolving equipment resolves the vector X into two vectors, one parallel to the resultant vector R shown as $X \cos \theta$ and one normal to R shown as $X \sin \theta$. The Y vector is similarly resolved into the component $Y \sin \theta$ which is parallel to the resultant vector R, and component $Y \cos \theta$ which is parallel to the vector $X \sin \theta$. The mechano-electrical device required to reduce the vectors X and Y into their several components is a complicated device and requires time for carrying out its operations. In the process of resolving the vectors X and Y into their various components, the resolving device is so constructed that the vectors $Y \cos \theta$ and $X \sin \theta$ are adjusted equal and opposite in their electrical manifestation by a complex error sensing device involving feedback loops and servo-motors. When said vector signals are equal and opposite in electrical terms, their summation is zero and the operator then is permitted to perform the second operation of determining the vector summation of X and Y by electrically adding the quantities $X \cos \theta$ and $Y \sin \theta$ by means of devices well known to the art. Both of these vectors are parallel and may be represented as simple algebraic functions capable of direct addition.

The phase angle $\theta$ in a device of this nature is derived from an error sensing device which senses when the sum of $Y \cos \theta$ and $X \sin \theta$ is zero. From the foregoing, it can be seen that prior devices for the vector summation of quadrature vectors necessarily are multi-staged devices in order to accomplish the desired mathematical operation.

Referring to Figs. 2 and 3 a brief description of the principle of operation of the present invention will be given. Vectors X and Y are the quadrature vectors whose sum R is required. The angular relationship between the vectors R and X is also desired. The angle is indicated in the diagram by the letter $\theta$. In order to effect the vector summation of the quadrature vectors X and Y by the present invention, the vector X is represented by a magnetic field of magnitude $\phi_x$, Fig. 3, created by a suitable coil having a D. C. current flowing through it whose magnitude is commensurate with the vector quantity X of Fig. 2. The desired direction for $\phi_x$ is determined by the direction of the coil axis producing $\phi_x$. $\phi_y$ is produced in a similar fashion, though displaced 90 degrees in space from $\phi_x$, thus effecting the quadrature relationship between the vector signals X and Y.

It is a characteristic of magnetic fields whose space directions differ that when they are combined in space the resultant magnetic field has a direction and magnitude of the vector R as seen in Fig. 3. Part of the present invention, therefore, relates to a means for sensing the direction of the resultant magnetic field whose direction and strength correspond to the direction and magnitude of the resultant vector R made up of the quadrature components X and Y.

Referring now to Figs. 4 to 7, a more detailed description of the present invention will be given. Fig. 4 shows a circuit diagram of the electro-mechanical means for combining any vectors X and Y which may be inserted into this embodiment of the invention. Thus, the coil 20 has flowing through it a current $I_y$ whose magnitude is proportional to the vector component Y. The coil 21 similarly has a current flowing through it whose magnitude is proportional to the magnitude of the X vector which is to be combined in quadrature with the Y vector. For a quadrature relationship between vectors X and Y, the angle $\beta$ between the axes 20a, and 21a of coils 20 and 21 is adjusted to 90 degrees. However, it is to be understood that angle $\beta$ may be other than 90 degrees, if desired, without departing from this invention. The individual magnetic fields produced by these currents flowing through their respective coils assume in space a direction coincidental with the axes of their respective coils.

When both coils are activated, however, a resultant magnetic field is produced which is the vector sum of $\phi_x$ and $\phi_y$. The coil 22 is made to revolve at a constant and sufficient angular velocity in the magnetic fields produced by the currents $I_x$ and $I_y$ flowing in the coils 20 and 21. It is found that rotation of the coil 22 about an axis 22a perpendicular to the plane of the axes of coils 20, 21, and 22 induces in the coil 22 a voltage which appears at the terminals 23 and 24 via the slip rings 23a and 24a and the brushes 23b and 24b that is proportional in magnitude to the vector sum of the currents $I_x$ and $I_y$ which in turn are proportional to the vector components X and Y for which the summation is desired. The nature of the voltage produced by the rotation of coil 22 is alternating and with a magnitude that is directly proportional to the magnitude of the resultant vector R of Fig. 2, and also the resultant vector $\phi_R$ of Fig. 3. This magnitude therefore gives immediately the length of the resultant vector from combining in quadrature the vectors X and Y.

The phase relationship of the voltage appearing at the terminals 23 and 24 with respect to vector X may be obtained, if desired, by comparing with the voltage signal, appearing at the aforesaid terminals 23 and 24, a second signal whose phase relationship with the instantaneous position of coil 22 is known. Thus, for example, in Fig. 4 is shown a small magnet 26 mounted mechanically and in angular co-relationship with the axis of coil 22, and which sweeps about the circle 25 at the same angular velocity as the coil 22 by reason of its fixed mechanical connection to the rotating shaft 22a on which coil 22 is mounted. Affixed at the periphery of the circle 25 is a small pick-up coil 27 located with its axis coincident with the axis of coil 21 and arranged in such a fashion that, as the magnet 26 sweeps by the coil 27 as shown in dotted lines at 26a, a signal is produced in coil 27. The signal so produced may be compared with the voltage produced at the terminals 23 and 24 in the fashion indicated by Fig. 6 wherein is shown a sine wave output voltage 31 of coil 22 and a signal voltage 32 produced by coil 27 upon which is a small marker pip 32a. By means of this marker pip, whose position indicates the phase position of the vector X, the phase relationship existing between the resultant vector R and the X vector may be determined. This phase relation is determined by measuring in suitable units the horizontally projected distance from the marker pip 32a along the axis 35 of sine wave 31 and the decreasing, zero intercept 34 of the sine wave 31. Thus, the distance measured between 33 and 34 is a measure of the angular relation of the resultant vector and its X vector component. It is apparent that the reference pip 32a may be positioned at any point on the sine wave curve by adjustment of the angular position of coil 27, thus permitting the phase relationship that exists between the signals appearing at the terminals 23 and 24 to be determined with respect to any convenient reference vector. Usually in studies of this nature, the reference vector is taken as one of the quadrature vectors whose summation is desired by the machine. Thus, as shown in Fig. 4, the reference pip producing device is located angularly in conjunction with the axis of coil 21. The magnitude of the voltage produced by the rotation of coil 22 may be determined by devices well known to the art such as any suitable voltage indicating instrument. Similarly, the phase relationship of the pip 32a and the voltage wave 31 may be determined by methods also well known to the art.

In Fig. 7 is shown a typical arrangement of the various electrical and mechanical parts previously described. Thus at 36 and 37 are shown D. C. amplifiers used for inserting the X and Y vector signals into coils 21 and 22 of Fig. 4. At 38 is shown the housing which encloses the stationary coils 20, 21 and rotating coil 22 with its associated slip rings and brushes. At 39 is shown the motor used for rotating the coil 22 of Fig. 4 via shaft 22a. Similarly the angular position indicating magnet 26 and coil 27 are shown externally of the housing 38. At 40 a suitable voltage indicating device is shown diagrammatically and at 41 a phase indicating device is illustrated.

From the foregoing discussion, it is apparent that by positioning the axes of the coils 20 and 21 to the angle existing between any two vectors possessing a known angular relationship, and not necessarily 90 degrees, the device will act as a vector summing device for any angular vectoral relationship.

Having thus described my invention, I claim:

1. A mathematical computing device for combining a plurality of vector quantities having any angular relationship with one another comprising a plurality of electrical coils corresponding in number to the number of vector quantities to be combined, each coil being adapted to be positioned and to be held stationary with its axis in alignment respectively with a corresponding vector quantity, means for feeding electrical current to each of said coils in proportion to the magnitude of its associated vector so that a resultant magnetic field proportional to the resultant vector of said vector quantities will be formed, an electrical coil rotatively mounted in juxtaposition with said plurality of electrical coils so that upon rotation the coil will pass through the resultant magnetic field inducing an electromotive force therein proportional to the intensity of the resultant magnetic field, means to rotate the coil at a uniform speed, and electrical means connected to said coil for measuring the magnitude of the electromotive force therein so that the magnitude of the resultant vector quantity can be directly determined.

2. A mathematical computing device for combining a plurality of vector quantities having any angular relationship with one another comprising a plurality of electrical coils corresponding in number to the number of vector quantities to be combined, each coil being adapted to be positioned and to be held stationary with its axis in alignment respectively with a corresponding vector quantity, means for feeding electrical current to each of said coils in proportion to the magnitude of its associated vector so that a resultant magnetic field proportional to the resultant vector of said vector quantities will be formed, an electrical coil rotatively mounted in juxtaposition with said plurality of electric coils so that upon rotation the coil will pass through the resultant magnetic field inducing an electromotive force therein, means to rotate the coil at a uniform speed, signal means associated with the rotating and stationary coils for indicating when the rotative coil passes a stationary point in its travel, and electrical means connected to the rotative coil and the signal means for determining the angular relationship between said stationary point and the point of maximum electromotive force, thereby enabling the direction of said resultant vector to be derived.

3. A mathematical computing device for combining a plurality of vector quantities having any angular relationship with one another comprising a plurality of electrical coils corresponding in number to the number of vector quantities to be combined, each coil being adapted to be positioned and to be held stationary with its axis in alignment respectively with a corresponding vector quantity, means for feeding electrical current to each of said coils in proportion to the magnitude of its associated vector so that a resultant magnetic field proportional to the resultant vector of said vector quantities will be formed, an electrical coil rotatively mounted in juxtaposition with said plurality of electrical coils so that upon rotation the coil will pass through the resultant magnetic field inducing an electromotive force therein proportional to the intensity of the resultant magnetic field, means to rotate the coil at a uniform speed, electrical means connected to said coil for measuring the magnitude of the electromotive force therein so that the magnitude of the resultant vector quantity can be directly determined, signal means associated with the rotating and stationary coils for indicating when the rotative coil passes a stationary point in its travel, electrical means connected to the rotative coil for measuring the magnitude of the electromotive force therein so that the magnitude of the resultant vector quantity can be determined, and other electrical means connected to the rotative coil and the signal means for determining the angular relationship between said stationary point and the point of maximum electromotive force so that the direction of said resultant vector can be determined.

4. A mathematical computing unit for combining a plurality of vector quantities having any angular relationship with one another comprising a plurality of magnetomotive force producing devices corresponding in number to the number of vector quantities to be combined, means for aligning said devices so that the magnetic field of each will be aligned to correspond in direction to its associated vector quantity, means for adjusting the intensity of the magnetic field of each device to correspond proportionately to the magnitude of its associated vector, a sensing element adapted to respond to the resultant magnetic field, means associated with said element for determining the intensity of the resultant magnetic field, and other means associated with said element for determining the direction of the resultant magnetic field.

5. A mathematical computing unit for combining a plurality of vector quantities having any angular relationship with one another comprising a plurality of magnetomotive force producing devices corresponding in number to the number of vector quantities to be combined, means for aligning said devices so that the magnetic field of each will be aligned to correspond in direction to its associated vector quantity, means for adjusting the intensity of the magnetic field of each device to correspond proportionately to the magnitude of its associated vector, means for combining the magnetic fields of each device, at least one sensing element adapted to respond to the resultant magnetic field, means associated with said element for determining the intensity of the resultant magnetic field, and other means associated with said element for determining the direction of the resultant magnetic field.

6. A mathematical computing unit for combining a plurality of vector quantities having any angular relationship to one another comprising a plurality of magnetomotive force producing devices corresponding in number to the number of vector quantities to be combined, means for aligning said devices so that the magnetic field of each will be aligned to correspond in direction to its associated vector quantity, means for adjusting the intensity of the magnetic field of each device to correspond proportionately to the magnitude of its associated vector, at least one sensing element responsive to the resultant magnetic field of said devices, and means associated with said element for determining the intensity of the resultant magnetic field.

7. A mathematical computing unit for combining a plurality of vector quantities having any angular relationship with one another comprising a plurality of magnetomotive force producing devices corresponding in number to the number of vector quantities to be combined, means for aligning said devices so that the magnetic field of each will be aligned to correspond in direction to its associated vector quantity, means for adjusting the intensity of the magnetic field of each device to correspond proportionately to the magnitude of its associated vector, at least one sensing element responsive to the resultant magnetic field of said devices, and means associated with said element for determining the direction of the resultant magnetic field.

References Cited in the file of this patent

UNITED STATES PATENTS

| | | |
|---|---|---|
| 2,511,614 | Agins et al. | June 13, 1950 |
| 2,519,180 | Ergen | Aug. 15, 1950 |
| 2,600,159 | Ergen | June 10, 1952 |
| 2,679,976 | Granat | June 1, 1954 |